United States Patent
Boksenberg et al.

(10) Patent No.: US 10,948,060 B2
(45) Date of Patent: Mar. 16, 2021

(54) POWER-ASSISTED STEERING ASSEMBLY

(71) Applicant: TRW Limited, Solihull (GB)

(72) Inventors: Jonathan Paul Boksenberg, Rickmansworth (GB); Maciej Kudanowski, Solihull (GB)

(73) Assignee: ZF Automotive UK Limited

( * ) Notice: Subject to any disclaimer, the term of this patent is extended or adjusted under 35 U.S.C. 154(b) by 335 days.

(21) Appl. No.: 16/205,467

(22) Filed: Nov. 30, 2018

(65) Prior Publication Data
US 2019/0162282 A1    May 30, 2019

(30) Foreign Application Priority Data
Nov. 30, 2017    (GB) .................................... 1720001

(51) Int. Cl.
*B62D 5/30*      (2006.01)
*F16H 37/06*     (2006.01)
(Continued)

(52) U.S. Cl.
CPC .......... *F16H 37/065* (2013.01); *B62D 5/0424* (2013.01); *B62D 5/0448* (2013.01);
(Continued)

(58) Field of Classification Search
CPC ...... F16H 37/065; F16H 25/2204; F16H 7/02; F16H 2025/2096; F16H 2025/2081;
(Continued)

(56) References Cited

U.S. PATENT DOCUMENTS 3,734,226 A * 5/1973 MacDuff .................. B62D 5/30
                                                      180/407
8,312,959 B1 11/2012 Schneider et al.
(Continued)

FOREIGN PATENT DOCUMENTS

DE       10310505 A1    9/2004
FR       2853613 A1    10/2004
(Continued)

OTHER PUBLICATIONS

Patents Act 1977: Search Report, Application No. GB1720001.5, dated May 17, 2018.

*Primary Examiner* — Kevin Hurley
*Assistant Examiner* — Marlon A Arce
(74) *Attorney, Agent, or Firm* — Robert James Harwood

(57) ABSTRACT

A power-assisted steering assembly for a vehicle comprises: a motor shaft for transmitting torque from a motor; a steering rack; a primary transmission mechanism; a secondary transmission mechanism; a motor coupling; and a rack coupling. The primary transmission mechanism is configured to transmit power from the motor shaft to the steering rack and includes a drive belt. The secondary transmission mechanism is configured to transmit power from the motor shaft to the steering rack upon a failure of the primary transmission mechanism. The motor coupling is configured to transmit power from the motor shaft to the primary transmission mechanism and the secondary transmission mechanism. The rack coupling is configured to transmit power from the primary transmission mechanism and the secondary transmission mechanism to the steering rack. Prior to the failure of the primary transmission mechanism, the motor coupling and rack coupling are configured to transmit a greater amount of power to the primary transmission mechanism than to the secondary transmission mechanism.

12 Claims, 2 Drawing Sheets

(51) Int. Cl.
  *B62D 5/04* (2006.01)
  *F16H 25/22* (2006.01)
  *F16H 7/02* (2006.01)
  *F16H 25/20* (2006.01)
  *B62D 15/02* (2006.01)
(52) U.S. Cl.
  CPC ............ *B62D 5/30* (2013.01); *F16H 7/02* (2013.01); *F16H 25/2204* (2013.01); *B62D 15/029* (2013.01); *F16H 2025/2081* (2013.01); *F16H 2025/2096* (2013.01)
(58) Field of Classification Search
  CPC ..... F16H 37/02; B62D 5/0424; B62D 5/0448; B62D 5/04; B62D 5/0427; B62D 5/30; B62D 15/029
  See application file for complete search history.

(56) References Cited

U.S. PATENT DOCUMENTS

| | | | |
|---|---|---|---|
| 9,302,701 B2 * | 4/2016 | Schneider | B62D 5/0409 |
| 9,845,106 B2 | 12/2017 | Bodtker et al. | |
| 2012/0097470 A1 * | 4/2012 | Yamasaki | B62D 17/00 |
| | | | 180/402 |
| 2018/0283541 A1 * | 10/2018 | Sudo | F16H 59/40 |
| 2019/0016377 A1 * | 1/2019 | Satou | B62D 5/0463 |

FOREIGN PATENT DOCUMENTS

| | | |
|---|---|---|
| JP | 2007131034 A | 5/2007 |
| JP | 2009051397 A | 3/2009 |
| JP | 2017193259 A | 10/2017 |

\* cited by examiner

POWER-ASSISTED STEERING ASSEMBLY

CROSS-REFERENCE TO RELATED APPLICATIONS

This application claims priority to Great Britain Patent Application No. 1720001.5, filed 30 Nov. 2017, the disclosures of which are incorporated herein by reference in entirety.

BACKGROUND TO THE INVENTION

The present invention relates to a power-assisted steering assembly and more specifically to the provision of a power-assisted steering assembly that can operate after a failure of a drive belt.

Power-assisted steering systems are commonly provided to supply power-assistance to the steering rack of a vehicle in order to assist with the movement of the wheels or other steering equipment. The power-assistance can be provided by an electric motor, hydraulic system, or other power generator, but is commonly required to be geared-down in order to provide the required movements of the steering rack in relation to the power-generator. This is particularly relevant to electric power-assisted steering systems, whereby the electric motor rotates at a high speed during activation.

It is therefore known to provide a transmission mechanism between the output shaft of the electric motor or other power generator and the steering rack. However, failure of the transmission mechanism can result in a loss of power-assistance to the user. It is therefore desired to provide a power-assisted steering system that provides fail-operational capability to a power-assisted steering system, such that function is retained even after an initial failure.

SUMMARY OF THE INVENTION

According to the invention, there is provided a power-assisted steering assembly for a vehicle, the power-assisted steering assembly comprising: a motor shaft for transmitting torque from a motor; a steering rack; a primary transmission mechanism configured to transmit power from the motor shaft to the steering rack, the primary transmission mechanism including a drive belt; a secondary transmission mechanism configured to transmit power from the motor shaft to the steering rack upon a failure of the primary transmission mechanism; a motor coupling configured to transmit power from the motor shaft to the primary transmission mechanism and the secondary transmission mechanism; and a rack coupling configured to transmit power from the primary transmission mechanism and the secondary transmission to the steering rack; wherein, prior to the failure of the primary transmission mechanism, the motor coupling and rack coupling are configured to transmit a greater amount of power to the primary transmission mechanism than to the secondary transmission mechanism.

The present invention therefore provides a belt-driven power-assisted steering assembly that is capable of operation even after failure of the primary transmission mechanism and in particular the drive belt. Moreover, the secondary transmission mechanism is protected from the transmission of substantial power whilst the primary transmission mechanism is fully functional—the motor coupling and rack coupling prevent the two transmission mechanisms having the same power transferred through them. The secondary transmission mechanism is therefore protected from loading that could result in its failure until such a time as the primary transmission mechanism fails.

Whilst the primary transmission mechanism is functional, the amount of power transmitted through the secondary transmission mechanism may be, for example, 5% or less of the total power transferred to the steering rack. When the primary transmission mechanism is non-functional, after failure, the secondary transmission mechanism transmits all of the power/torque to the steering rack.

The drive belt may be a toothed belt that engages with teeth on the motor coupling and rack coupling.

One of the motor coupling and rack coupling may comprise a first couple part in communication with the primary transmission mechanism, a second couple part in communication with the secondary transmission mechanism, and a lost-motion mechanism connecting the first couple part to the second couple part, the lost-motion mechanism allowing relative rotation of the first couple part and second couple part by an amount limited by the function of the lost-motion mechanism.

By allowing relative rotation of the first couple part and second couple part, the secondary transmission mechanism is at least partially isolated from the power being transmitted by the motor shaft to the primary transmission mechanism.

The first couple part and second couple part may each comprise a gear or pulley and may rotate about a longitudinal axis of the motor shaft. The first couple part and second couple part will therefore be in parallel. As such, the primary transmission mechanism and secondary transmission mechanism may also be in parallel.

The first couple part and second couple part may be adjacent to one another. The lost-motion mechanism may be formed on adjacent, facing, faces of the first couple part and second couple part.

The lost-motion mechanism may comprise a tooth and a detent engageable by the tooth, movement of the first couple part causing relative movement of the tooth and detent as the motor shaft rotates. As will be clear, the tooth may be formed on one of the first couple part and second couple part with the detent formed on the other of the first couple part and second couple part.

The movement of the tooth relative to the detent therefore provides the lost-motion of the lost-motion mechanism. A plurality of teeth may be provided that engage with a plurality of detents. Two facing sets of teeth may be provided, the detents being defined by the spaces between adjacent teeth.

The maximum gap between a tooth and the edge of an adjacent detent may be limited such that the lost-motion mechanism provides, at most, a relative rotation of a width of a tooth, in order to limit backlash.

The lost-motion mechanism may further comprise a compressible element that is compressed by movement of the tooth relative to the detent. The compressible element may comprise a rubber damper. The compressible element may be retained within the detents and may fill the detents such that there is substantially no empty space provided, any movement of the teeth causing some compression of the compressible element.

The compressible element may be under some compression at all times, for example by sizing or shaping the compressible element such that it forms an interference fit with the tooth or teeth of the lost-motion mechanism. Keeping the compressible element under compression will further limit or even totally remove backlash from the mechanism, ensuring a smooth transmission even when the motor shaft reverses direction of rotation.

By providing a compressible element, the movement of the tooth relative to the detent can be dampened or cushioned, preventing or limiting backlash. Moreover, the selection of the compressible element can be made to specifically design the motor coupling such that a desired proportion of power or total power is transmitted through the secondary transmission mechanism, prior to failure of the primary transmission mechanism.

The material of the compressible element may be selected such that, whilst the primary transmission mechanism is functional, the compressible element is only slightly compressed during rotation of the motor shaft, but, when the primary transmission mechanism fails, the compressible element is compressed a greater amount during rotation of the motor shaft. The maximum compression of the compressible element may be limited to one gear tooth pitch of the motor coupling. Due to the fact that such a compression amounting to one gear tooth pitch will be achieved quickly, this minimises motor backlash if the power is being transferred through the secondary transmission mechanism.

The lost-motion mechanism may include a spring-pin coupling. The spring-pin coupling may include a spring pin fixed relative to one of the first couple part and the second couple part and a spring-pin receiver on the other of the first couple part and the second couple part.

In normal use, the spring pin will be in a disengaged position, not within the spring-pin receiver, relative movement of the first couple part and second couple part being limited by the power-assisted steering assembly such that the spring-pin does not engage. However, when the primary transmission mechanism fails, allowing relative movement past the limit, the spring pin will align with the spring-pin receiver and will move to an engaged position, engaging the spring-pin receiver. The first couple part and second couple part will then be fixed relative to each other, ensuring power transmission between the first couple part and second couple part.

A spring-pin coupling enables limited relative movement of the first couple part and second couple part whilst providing positive engagement that prevents further relative movement once all of the limited relative movement has been allowed. In normal use, the spring-pin coupling would therefore prevent substantial transmission of power to the secondary transmission mechanism whilst, upon failure of the primary transmission mechanism, positively engaging the first couple part with the second couple part to achieve power transmission through the secondary transmission mechanism.

The other of the motor coupling and rack coupling may fixedly couple the primary transmission mechanism and the secondary transmission mechanism.

The motor coupling may include the first coupling part and second coupling part and the rack coupling fixedly couples the primary transmission mechanism and the secondary transmission mechanism.

By fixedly coupling the primary transmission mechanism to the secondary transmission mechanism, power transmitted through the primary transmission mechanism will necessarily result in the movement of the secondary transmission mechanism, but without the transference of power.

The power-assisted steering assembly may further comprise a housing configured to separate the primary transmission mechanism from the secondary transmission mechanism over at least a part of a path of the drive belt. The housing may include walls that limit clearance between the housing and the rack coupling and/or motor coupling. The clearance may be limited to less than a dimension of the drive belt preferably the smallest dimension of the drive belt, such as its thickness—such that even if broken the drive belt may be unable to pass through the clearance between the housing and the rack coupling and/or motor coupling.

By providing a housing, the drive belt can be prevented from interfering with the operation of the secondary transmission mechanism even upon failure of the drive belt. The housing may also be sized and/or shaped such that there is sufficient space to prevent a snapped drive belt from becoming jammed between the housing and the motor coupling and rack coupling.

The secondary transmission mechanism may comprise an additional drive belt. Where two drive belts are used, it may be desirable for the two drive belts to be manufactured independently, to avoid common-cause failure of both drive belts due to a manufacturing defect. Whilst the primary transmission mechanism is functional, the assembly may be configured such that the drive belt of the secondary transmission mechanism has a dynamic tension that is 5% or less of the dynamic tension of the drive belt of the primary transmission mechanism.

Static tension in both belts may be equal to ensure that the system functions correctly. Dynamic tension is therefore the additional tension provided to the drive belts by operation of the motor.

The additional drive belt may run in parallel and adjacent to the drive belt of the primary transmission mechanism. The two drive belts may follow substantially the same path, such that there is minimal difference between the operation of the primary transmission mechanism and the secondary transmission mechanism. Having substantially identical paths for the drive belts may result in a more consistent feel during power-assistance.

The secondary transmission mechanism may comprise an idler gear. The idler gear may be loosely meshed in order that drive is normally provided by the drive belt of the primary transmission mechanism. The parts of the motor coupling and the rack coupling that are configured to engage with the idler gear may have a different tooth depth to those that are configured to engage with the drive belt. For example, the gear teeth may require a deeper tooth depth.

The use of an idler gear will prevent failure of the secondary transmission mechanism in the same way as the drive belt.

The idler gear may be sized such that it remains in mesh over a full range of adjustment of the primary transmission mechanism. Adjustment of the primary transmission mechanism may include the operation of a tensioning mechanism for the drive belt. Therefore, operation of the tensioning mechanism will not affect the operation of the idler gear.

The power-assisted steering assembly may include a failure detector that detects failure of the primary transmission mechanism and/or the secondary transmission mechanism. The failure detector may include an optical sensor that detects presence or absence of the drive belt, or a magnetic sensor that detects the presence or absence of a magnetic element associated with the primary transmission mechanism or secondary transmission mechanism.

The failure detector may include two sensors for detecting the failure of each transmission mechanism independently.

The failure detector could also or alternatively detect the torque or power transmitted to the second coupling part from the first coupling part. Thus, it could be determined what proportion of the total torque is being transmitted and thus whether the primary transmission mechanism is functional.

The failure detector could also or alternatively measure a change in lash between the motor coupling and rack coupling. In normal use, the secondary transmission mechanism may be configured to exhibit greater lash than the primary transmission mechanism, this lash changing upon the failure of the primary transmission mechanism.

The rack coupling and/or motor coupling may include flanges for helping to retain the drive belts on the rack coupling and/or motor coupling. Where provided, the flanges may co-operate with the housing in order to provide retention of the drive belts, for example by acting to reduce clearance between the couplings and the housing.

Other advantages of this invention will become apparent to those skilled in the art from the following detailed description of the preferred embodiments, when read in light of the accompanying drawings.

DETAILED DESCRIPTION OF THE INVENTION

Figure 1:
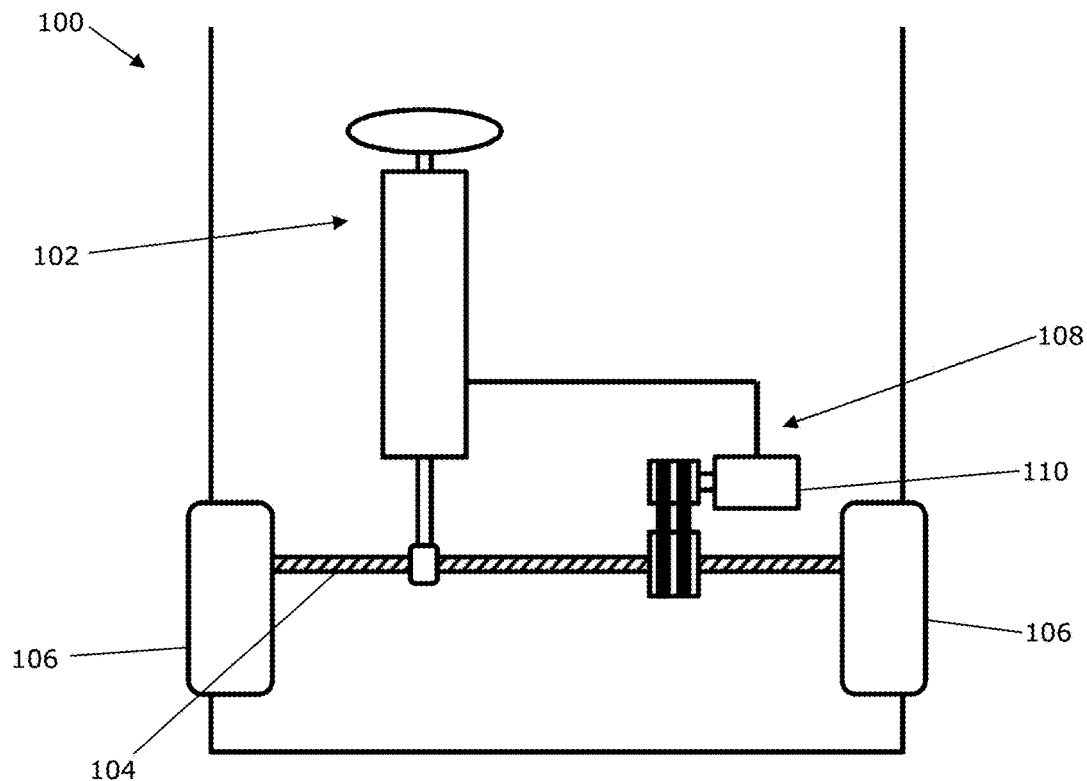
FIG. 1 is a schematic view of a vehicle including a power-assisted steering assembly in accordance with the present invention.

Referring firstly to FIG. 1, there is shown a schematic view of a vehicle 100. The vehicle 100 includes a steering mechanism 102 in communication with a steering rack 104 and through this to the wheels 106 of the vehicle 100, of which only two are shown. The wheels 106 to which the steering rack 104 and steering mechanism 102 are connected may therefore be steered by a driver of the vehicle 100. The steering mechanism 102 communicates with a power-assisted steering assembly 108 that provides power-assistance to assist in the steering of the wheels 106. The power-assistance is provided directly to the steering rack 104.

The power-assisted steering assembly 108 of the depicted embodiment includes an electric motor 110 that rotates a motor shaft 112. The motor shaft 112 transfers power to a motor coupling 114, through a primary transmission mechanism 116 including a drive belt 118, to a rack coupling 120 disposed on the steering rack 104. A secondary transmission mechanism 122 that includes an additional drive belt 124 is also located between the motor coupling 114 and the rack coupling 120.

Figure 2:
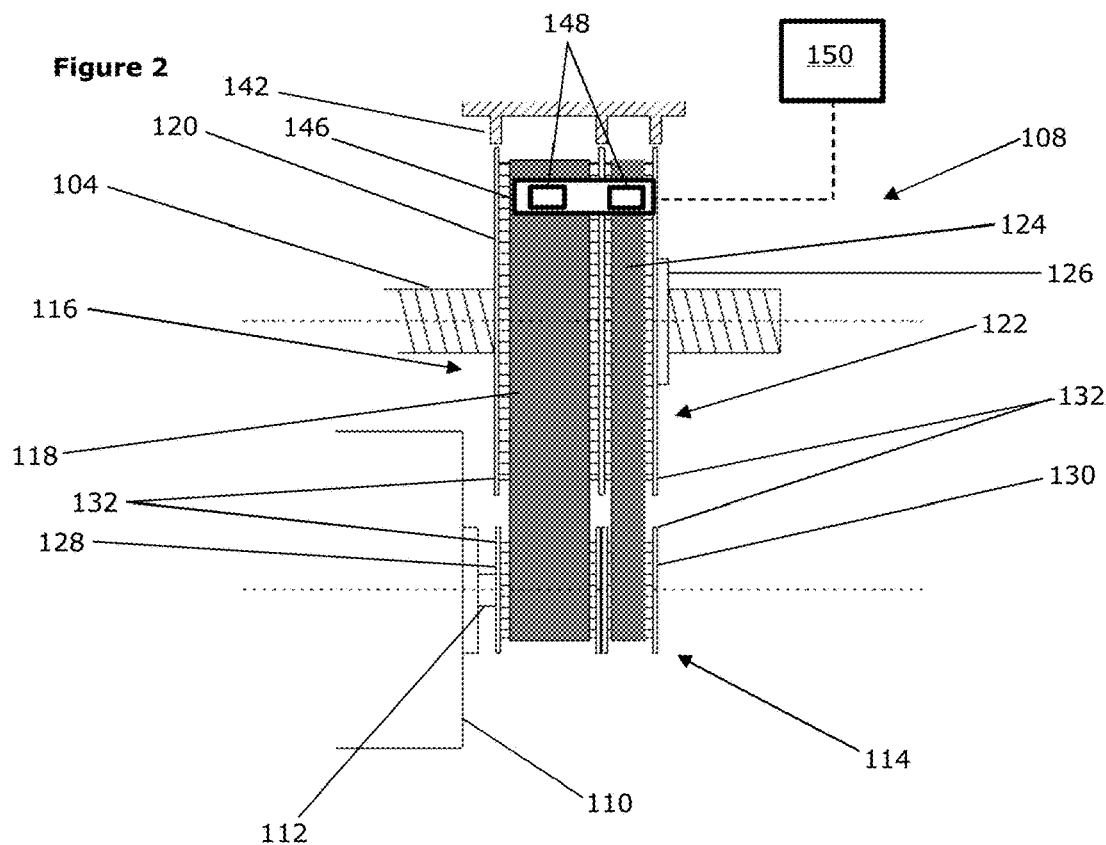
FIG. 2 is a detail view of the power-assisted steering assembly of FIG. 1.

An enlarged view of the motor coupling 114, rack coupling 120, primary transmission mechanism 116 and secondary transmission mechanism 122 is shown in FIG. 2. The rack coupling 120 includes a ball-screw mechanism 126 which engages with the steering rack 104, rotation of the rack coupling 120 therefore causing lateral motion of the steering rack 104.

Both the drive belt 118 of the primary transmission mechanism 116 and the drive belt 124 of the secondary transmission mechanism 122 are toothed belts and engage with pulley teeth on both the motor coupling 114 and rack coupling 120. Thus, the drive belts 118, 124 have no slippage and transfer power efficiently. However, if desired it will be known that drive belts operating through friction alone may instead be used for either or both of the drive belts 118, 124.

The motor coupling 114 includes a first couple part 128 and a second couple part 130. As can be seen in FIG. 2, the first couple part 128 engages with the drive belt 118 of the primary transmission mechanism 116 and the second couple part 130 engages with the drive belt 124 of the secondary transmission mechanism 122. Both the motor coupling 114 and rack coupling 120 include flanges 132 that separate the drive belts 118, 124 from one another and also act to retain the drive belts 118, 124 on the motor coupling 114 and rack coupling 120.

Figure 3:
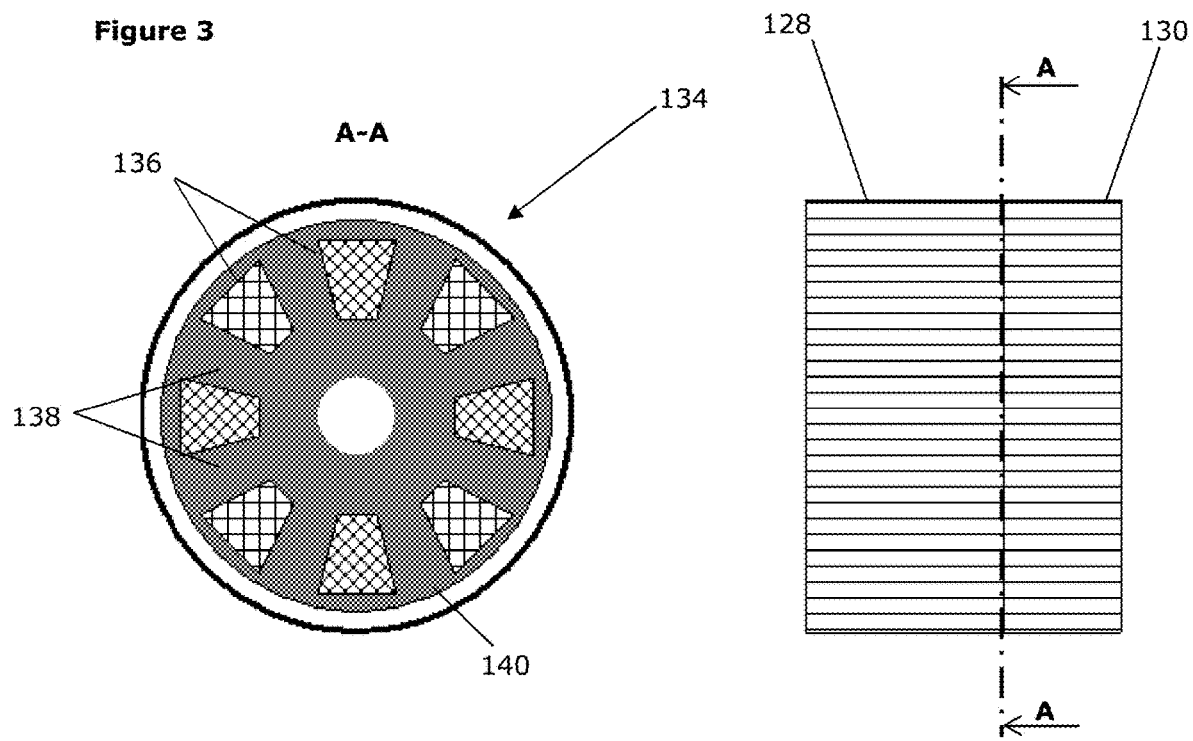
FIG. 3 is a plan and cross-sectional view of the motor coupling of the power-assisted steering assembly of FIG. 1.

FIG. 3 shows both a plan and cross-sectional view of the motor coupling 114 of FIG. 2, although the flanges 132 are omitted for clarity.

Whilst the motor shaft 112 is rigidly connected to the first couple part 128, it can be seen that the first couple part 128 and the second couple part 130 are inter-engaged by a dog-tooth arrangement 134. The opposed faces of the first couple part 128 and the second couple part 130 each comprise a number of teeth 136—in this case four teeth 136 being provided on each of the first couple part 128 and the second couple part 130. The teeth 136 of each of the couple parts 128, 130 are received within the detents 138 defined between the teeth 136 of the other of the couple parts 128, 130. In addition, a compressible element 140, provided in the present embodiment as a rubber damper, is disposed between the teeth 136 and within the detents 138. Relative movement of the teeth 136 is therefore enabled with some damping provided by the compressible element 140. The dog-tooth arrangement 134 therefore provides a lost-motion mechanism.

Because the compressible element 140 is designed to be always under slight compression, backlash noise is virtually eliminated during normal operation. Even after wear of the compressible element 140, which may occur over time, the dog-tooth arrangement will still provide a lost-motion mechanism.

In the present embodiment, it will be apparent that the second couple part 130 does not transmit power directly from the rotation of the motor shaft 112 but instead rotates due to the motion of the first couple part 128 and the engagement through the lost-motion mechanism. However, in practice—as will become apparent—the second couple part 130 only transmits a significant amount of power to the secondary transmission mechanism 122 when the primary transmission mechanism 116 has failed through breakage, slippage, or otherwise.

The operation of the power-assisted steering assembly 108 will now be discussed.

Energisation of the motor 110, most commonly associated with a torque detected within the steering mechanism 102 of the vehicle 100, causes rotation of the motor shaft 112, this rotation being passed to the motor coupling 114 and more particularly to the first couple part 128. The first couple part 128 therefore begins to rotate. The rotation of the first couple part 128 causes motion of the drive belt 118 of the primary transmission mechanism 116, this motion being passed to the rack coupling 120, causing movement of the steering rack 104. Thus, when the primary transmission mechanism 116 is functional, power is transmitted from the motor shaft 112 to the steering rack 104. Movement of the secondary transmission mechanism 122 will now be considered.

Whilst the primary transmission mechanism 116 is functional, the secondary transmission mechanism 122 is prevented from being placed under a substantial load or significant tension due to the action of the motor coupling 114 and rack coupling 120. Considering firstly the motor coupling 114, the dog-tooth arrangement 134 ensures that relative motion is provided between the first couple part 128 and the second couple part 130. As the first couple part 128 rotates, this motion is absorbed by the relative movement of the teeth 136 and the compression of the compressible element 140. By this mechanism, the secondary transmission mechanism 122 is subjected to a significantly lower torque than the primary transmission mechanism 116.

Additionally, the rack coupling 120, to which the primary transmission mechanism 116 transmits torque, is formed such that the drive belts 118, 124 of the primary transmission mechanism 116 and the secondary transmission mechanism 122 are fixed relative to one another. Therefore, as the primary transmission mechanism 116 transmits power from the motor shaft 112, the drive belt 124 of the secondary transmission mechanism 122 is forced to turn. However, the drive belt 124 of the secondary transmission mechanism 122 is not under load at the end engaging the motor coupling 114 and therefore the drive belt 124 is not put under significant dynamic tension. It can therefore be understood that the secondary transmission mechanism 122 rotates with the motion of the primary drive mechanism 116 but does not transmit significant power and is not put under significant dynamic tension whilst the primary transmission mechanism 116 is functional.

Upon a failure of the primary transmission mechanism 116—for example by the drive belt snapping or otherwise failing to transmit power—the rack coupling 120 will no longer move the secondary transmission mechanism 122. Therefore, the lost-motion mechanism of the motor coupling 114 will be forced to transmit all power through to the second couple part 130 and thus to the drive belt 124 of the secondary transmission mechanism 122. Upon a reversal in direction of rotation of the motor shaft 112, the lost-motion mechanism will again operate, but power will still be transmitted to a sufficient extent to allow proper operation of the steering. Therefore, with the drive belt 118 of the primary transmission mechanism 116 in a non-functioning state, the secondary transmission mechanism 122 will provide a back-up pathway for the transmission of power.

A housing 142 is shown in cross-section at the top of FIG. 2, but in actuality extends around the path of the primary transmission mechanism 116 and the secondary transmission mechanism 122. The housing 142 is provided with small clearances around the flanges 132 such that the drive belts 118, 124 may not pass through the clearances if they were to become dislodged from the motor coupling 114 or rack coupling 120 or if they were to break. Although the housing 142 is, in the present embodiment, shown around both the primary transmission mechanism 116 and the secondary transmission mechanism 122, it may only be provided around one or other of the mechanisms 116, 122, for simplicity.

Figure 4:
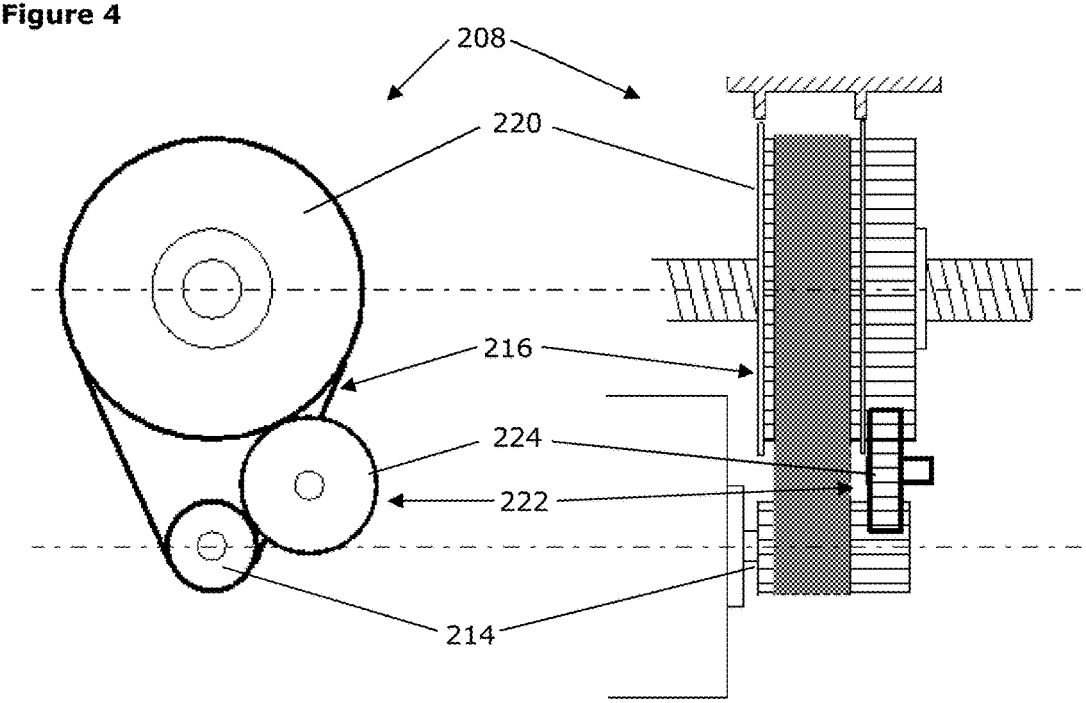
FIG. 4 is a detail view of a second embodiment of a power-assisted steering assembly.

An alternative embodiment of a power-assisted steering assembly 208 is shown in FIG. 4, in both side-on and plan view. The majority of the components of the power-assisted steering assembly 208 are the same as those of the first embodiment and therefore further description is omitted, for brevity.

The embodiment of FIG. 4 differs from that which has previously been described in that the secondary transmission mechanism 222 takes the form of an idler gear 244 that engages with teeth on the motor coupling 214 and rack coupling 220. The idler gear 244 operates in much the same way as the drive belt 124 of the first embodiment, in that it whilst the primary transmission mechanism 216 is functional it does not transmit significant power due to the action of the motor coupling 214 and the rack coupling 220 but does so if the primary transmission mechanism 216 becomes non-functional.

Beneficially, the use of an idler gear 244 further prevents any failure of the secondary transmission mechanism 222 due to rupture or other breakage of the drive belt 124. Whilst an idler gear 244 may provide additional resistance or power-loss whilst operating the power-assisted steering mechanism 208, this would be acceptable in the case that the primary transmission mechanism 216 was non-functional, at least until a repair could be effected. With the primary transmission mechanism 216 functional, the idler gear 244 would not add any significant resistance to operation as it would not be under loading, as discussed in relation to the first embodiment.

Referring again to FIG. 2, a failure detector 146 is provided that detects the failure of the drive belts 118, 124 of the primary transmission mechanism 116 and the secondary transmission mechanism 122. The failure detector 146 of the present embodiment includes two optical sensors 148, each of which is configured to detect the presence of its respective drive belt 118, 124. Therefore, if either drive belt 118, 124 fails, for example by snapping, the respective optical sensor 148 will detect this failure and can transmit this to an ECU 150 of the vehicle 100 or steering assembly 108.

The ECU 150 can then alter the operation of the vehicle 100 or steering assembly 108, if required, in order to put the vehicle 100 and/or steering assembly 108 into a 'limp-home' mode. For example, upon the failure of the primary transmission mechanism 116, the steering assembly 108 may be programmed to provide less power from the motor 110, in order that the secondary transmission mechanism 122 is not forced to transfer a degree of power that may result in failure of the drive belt 124 of the secondary transmission mechanism 122.

Although the present embodiment uses optical sensors 148, it will be apparent to the skilled person that other sensors may be used, such as magnetic sensors that detect magnetic elements within the transmission mechanisms. Alternative sensing mechanisms will be readily apparent to the skilled person.

Although it is stated in the above embodiments that the secondary transmission mechanism does not transmit significant power whilst the primary transmission mechanism is functional, it is possible for the system to be designed such that a chosen amount of tension is provided through the primary transmission mechanism. This could be provided by adjusting the amount of lost-motion available in the motor coupling and through selection of the compressible element to provide a set level of resistance. Such adaptations would be readily achievable by the skilled person in view of the present disclosure.

The drive belts of the primary transmission mechanism and the secondary transmission mechanism should be manufactured separately from one another rather than being two parts from the same larger belt. By doing so, it is less likely that both drive belts could be subject to a common cause failure due to manufacturing defects.

A further advantage may be gained by providing independent tensioning mechanisms for each drive belt. Although not shown, such mechanisms would ensure that there is no common failure mode associated with loss of tension and associated belt slippage of the primary and secondary transmission mechanisms.

Although described in relation to the motor coupling, it may also be possible to provide the first coupling part and second coupling part as parts of the rack coupling. Where this is the case, the first coupling part will be held stationary relative to the ball-screw mechanism with the second coupling part transmitting power through the lost-motion mechanism and the first coupling part. The motor coupling may then be configured such it holds the primary transmission mechanism and secondary transmission mechanism fixedly relative to one another. Thus, the transmission is effectively reversed.

In accordance with the provisions of the patent statutes, the principle and mode of operation of this invention have been explained and illustrated in its preferred embodiments. However, it must be understood that this invention may be practiced otherwise than as specifically explained.

What is claimed is:

1. A power-assisted steering assembly for a vehicle, the power-assisted steering assembly comprising:
    a motor shaft for transmitting torque from a motor;
    a steering rack;
    a primary transmission mechanism configured to transmit power from the motor shaft to the steering rack, the primary transmission mechanism including a drive belt;
    a secondary transmission mechanism configured to transmit power from the motor shaft to the steering rack upon a failure of the primary transmission mechanism;
    a motor coupling configured to transmit power from the motor shaft to the primary transmission mechanism and the secondary transmission mechanism; and
    a rack coupling configured to transmit power from the primary transmission mechanism and the secondary transmission mechanism to the steering rack;
    wherein, prior to the failure of the primary transmission mechanism, the motor coupling and rack coupling are configured to transmit a greater amount of power to the primary transmission mechanism than to the secondary transmission mechanism.

2. The power-assisted steering assembly according to claim 1, wherein one of the motor coupling and rack coupling comprises a first couple part in communication with the primary transmission mechanism, a second couple part in communication with the secondary transmission mechanism, and a lost-motion mechanism connecting the first couple part to the second couple part, the lost-motion mechanism allowing relative rotation of the first couple part and second couple part by an amount limited by the function of the lost-motion mechanism.

3. The power-assisted steering assembly according to claim 2, wherein the lost-motion mechanism comprises a tooth and a detent engageable by the tooth, movement of the first couple part causing relative movement of the tooth and detent as the motor shaft rotates.

4. The power-assisted steering assembly according to claim 3, wherein the lost-motion mechanism further comprises a compressible element that is compressed by movement of the tooth relative to the detent.

5. The power-assisted steering assembly according to claim 2, wherein the lost-motion mechanism includes a spring-pin coupling.

6. The power-assisted steering assembly according to claim 2, wherein the other of the motor coupling and rack coupling fixedly couples the primary transmission mechanism and the secondary transmission mechanism.

7. The power-assisted steering assembly according to claim 6, wherein the motor coupling includes the first couple part and second couple part and the rack coupling fixedly couples the primary transmission mechanism and the secondary transmission mechanism.

8. The power-assisted steering assembly according to claim 6, wherein the rack coupling includes the first couple part and second couple part and the motor coupling fixedly couples the primary transmission mechanism and the second transmission mechanism.

9. The power-assisted steering assembly according to claim 1, further comprising a housing configured to separate the primary transmission mechanism from the secondary transmission mechanism over at least a part of a path of the drive belt.

10. The power-assisted steering assembly according to claim 1, wherein the secondary transmission mechanism comprises an additional drive belt.

11. The power-assisted steering assembly according to claim 1, wherein the secondary transmission mechanism comprises an idler gear.

12. The power-assisted steering assembly according to claim 11, wherein the idler gear is sized such that it remains in mesh over a full range of adjustment of the primary transmission mechanism.

* * * * *